United States Patent
Hagino

(10) Patent No.: US 8,376,868 B2
(45) Date of Patent: Feb. 19, 2013

(54) ROTATION SHAFT VIBRATION DAMPING MECHANISM

(75) Inventor: Yasuyuki Hagino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/062,618

(22) PCT Filed: Oct. 1, 2009

(86) PCT No.: PCT/JP2009/005066
§ 371 (c)(1), (2), (4) Date: Mar. 7, 2011

(87) PCT Pub. No.: WO2011/039817
PCT Pub. Date: Apr. 7, 2011

(65) Prior Publication Data
US 2011/0207538 A1    Aug. 25, 2011

(51) Int. Cl.
*F16C 3/02* (2006.01)
*F16F 15/20* (2006.01)

(52) U.S. Cl. .................................. 464/180

(58) Field of Classification Search .......... 464/127, 464/180; 188/378; 180/380, 381
See application file for complete search history.

(56) References Cited

U.S. PATENT DOCUMENTS
2,089,168 A * 8/1937 Brown
2004/0248655 A1 12/2004 Tsuruta et al.

FOREIGN PATENT DOCUMENTS
| JP | 63 43045 | 2/1988 |
| JP | 8-105489 | 4/1996 |
| JP | 9 100874 | 4/1997 |
| JP | 2000 130605 | * 5/2000 |
| JP | 2004 131219 | 4/2004 |
| JP | 2005 207551 | 8/2005 |
| JP | 2006 38138 | 2/2006 |

OTHER PUBLICATIONS

International Search Report issued Nov. 24, 2009 in PCT/JP09/05066 filed Oct. 1, 2009.

* cited by examiner

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

A vibration damping mechanism of a rotation shaft that is not likely to be subject to the limitation in layout and that is capable of stably maintaining damping properties by a frictional contact portion without variation for a long term is provided. The vibration damping mechanism includes a shaft for outputting torque inputted from its input side end portion to its output side end portion, and a damping member having a fixed portion fixed to the shaft and a frictional contact portion held in frictional contact with the shaft, in which the frictional contact portion is provided with a clamping band for urging the frictional contact portion toward the shaft to be held in frictional contact with the shaft at a predetermined contact pressure.

12 Claims, 10 Drawing Sheets

ROTATION SHAFT VIBRATION DAMPING MECHANISM

TECHNICAL FIELD

The present invention relates to a rotation shaft vibration damping mechanism, and more particularly to a rotation shaft vibration damping mechanism for damping vibrations of a rotation shaft with a frictional contact element mounted on the rotation shaft.

BACKGROUND ART

There have so far been proposed a wide variety of apparatuses each of which comprises an intermediate shaft of a vehicular drive shaft, and a dynamic damper having a bending vibration damping function for a measure against gear noise and booming noise. However, the intermediate shaft of the drive shaft is generally a steel rod or a rotation shaft with no damping ability, thereby resulting in such problems as a so-called rattling noise, jerkiness and the like caused by torsion vibrations of a drive system. Here, the rattling noise is generated with idling gear pairs in a transmission clashing with each other by torsional resonances of the drive system while a vehicle is accelerated or decelerated in middle and high speed gears.

On the other hand, as a vehicular damping mechanism for damping the torsion vibrations of the drive system, there has so far been known a damper disc type of damping mechanism constructed to have first and second stage properties. The first stage property is to generate hysteresis relatively small with a first resilient member and a first friction generation mechanism at the time of a relative torsion angle of an input portion to an output portion being small, while the second stage property is to generate hysteresis relatively large with a second resilient member larger in spring pressure than the first resilient member and a second friction generation mechanism capable of producing a larger friction than the first friction generation mechanism.

The known damper disc type of vibration damping mechanism comprises a first friction generation mechanism having an urging member curved in a radial direction and in a shape of disc spring, and a hub moving mechanism for moving a flange in an axial direction away from a first disc plate when the relative torsion angle between the flange serving as input and output members and the first disc plate exceeds a predetermined angle. When the hub moving mechanism is operated, the engagement position (fulcrum position in a radial direction) of the urging member curved in cross section to the second plate connected to the first plate across the flange is gradually displaced. The displaced engagement position causes the hysteresis torque generated by the friction of the urging member and the flange to be radially increased steplessly, thereby making it possible to smoothly vary the torsion property at the time of the first and second stage properties being switched over between them (see for example Patent Document 1).

However, the damper disc type of vibration damping mechanism thus constructed leads to its large dimension in the radial direction, so that the damping mechanism is likely to be subject to the limitation in layout. It is therefore not suitable to mount the damper disc type of vibration damping mechanism on the intermediate shaft of the drive shaft.

In view of this problem, there has so far been proposed another vibration damping mechanism provided in a hollow hole formed in a power transmission shaft to make the vibration damping mechanism not to be subject to the limitation in layout.

The known vibration damping mechanism has a first shaft formed with a hollow hole, and a second shaft having one end portion fixed to the inner circumferential portion of the first shaft and the other end portion spaced apart from the inner circumferential portion of the first shaft to form an annular gap therebetween having an annular friction member filled therein. The friction member functions to generate a hysteresis torque in response to the relative torsion between the first and the second shafts. The magnitude of the hysteresis torque is set to be proportionate to the torsion rigidity of the second shaft and the torsion angle between the input and output end portions of the first shaft (see for example Patent Document 2).

Patent Documents

Patent Document 1: Patent Publication No. H9 (1997)-100874

Patent Document 2: Patent Publication No. 2006-038138

SUMMARY OF INVENTION

Problems to be Solved

However, even though the conventional vibration damping mechanism of the rotation shaft is constructed to reduce the radial dimension of the power transmission shaft to avoid the limitation in layout as described above, it still encounters such problems as follows.

The conventional vibration damping mechanism is constructed to generate the hysteresis torque in response to the relative torsion angle of the first and second shafts in the state that the friction member is in contact with the first and second shafts in a wide range, thereby resulting in the fact that the hysteresis torque generated is deviated and varied to a large extent.

Moreover, the wear progression of the friction member is greatly different between the one axial end side and the other axial end side of the friction member, thereby causing the wear of the friction member to greatly progress near the position (axial position) where the relative torsion angle between the first and second shafts becomes the largest. This leads to a remarkable decline in the damping property of the vibration damping mechanism as the duration of use increases.

The present invention has been made to overcome such conventional problems, and has an object to provide a vibration damping mechanism of a rotation shaft which is not likely to be subject to the limitation in layout and, in addition, can maintain the damping property in a stable state for a long term with no variability.

Means to Solve the Problem

To achieve the above object, the present invention is characterized by a vibration damping mechanism of a rotation shaft, which comprises a rotation shaft for outputting torque inputted from its input side end portion to its output side end portion, and a damping member having a fixed portion fixed to the rotation shaft, and a frictional contact portion held in frictional contact with the rotation shaft, in which the frictional contact portion is provided with an urging means for urging the frictional contact portion toward the rotation shaft to be held in frictional contact with the rotation shaft at a predetermined contact pressure.

By the construction previously defined, the contact pressure of the frictional contact portion to the rotation shaft is stably applied by the urging means, so that the damping property by the frictional contact portion can be stably maintained in a long term without variation and without being affected by wear of the frictional contact portion and dimensional variability of the combination of the rotation shaft and the frictional contact portion. Moreover, the vibration damping mechanism can be sufficiently small in diametrical dimension as compared with the damper disc type of the damping mechanism and thus, is not likely to be subject to the limitation in layout.

In the vibration damping mechanism of the rotation shaft of the present invention having the above mentioned construction, it is preferable that the frictional contact portion of the damping member be arranged in spaced relationship with the fixed portion in an axial direction of the rotation shaft.

By the construction previously defined, not only the contact pressure of the frictional contact portion to the rotation shaft but also the amount of relative frictional movement of the frictional contact portion to the rotation shaft at the time of vibrations of the rotation shaft can stably be secured, thereby bringing about a stable damping property to the damping mechanism. The amount, herein called, of the relative frictional movement of the frictional contact portion to the rotating shaft at the time of vibrations of the rotation shaft is intended to include at least one of the amount of frictional movement in the relative torsion direction of the frictional contact portion to the rotation shaft at the time of torsion vibrations of the rotation shaft, and the amount of frictional movement in the relative axial direction of the frictional contact portion to the rotation shaft at the time of bending vibrations of the rotation shaft.

In the vibration damping mechanism of the rotation shaft according to the present invention, it is preferable that the urging means be constructed to apply to the damping member an urging force to urge the frictional contact portion in a radial direction of the rotation shaft at a position spaced apart from the fixed portion in the axial direction of the rotation shaft.

By the construction previously defined, a simple clamping ring and the like can be used to apply an adequate contact pressure to the frictional contact portion. Furthermore, when the urging force is applied, for example, through an arm member having the other end portion farther away from the fixed portion than the one end portion and the frictional contact portion supported to the fixed portion to be rocked or deflectable, applying only a small urging force at a position farther away from the fixed portion than the frictional contact portion can obtain an effective frictional contact pressure at the frictional contact portion.

In the vibration damping mechanism of the rotation shaft according to the present invention, it is preferable that the damping member have at least one deflection arm portion extending in the axial direction of the rotation shaft between the frictional contact portion and the fixed portion, and the frictional contact portion be supported on the fixed portion through the deflection arm portion to be deformable in the radial direction of the rotation shaft in response to deflection of the deflection arm portion.

By the construction previously defined, the use of a simple clamping ring and the like, or setting an initial deflection amount (resilient deformation amount) to the degree of applying a sufficient contact pressure to the deflection arm portion can apply an adequate contact pressure to the frictional contact portion in a stable state for a long term. The at least one deflection arm portion is more preferably be two or more deflection arm portions of equi-angularly spaced apart one from the other.

In the vibration damping mechanism of the rotation shaft according to the present invention, it is preferable that the fixed portion of the damping member be formed in an annular shape to surround the rotation shaft, and the damping member have at least one slit formed to extend in the axial direction of the rotation shaft by the fixed portion and the deflection arm portion.

By the construction previously defined, forming the deflection arm portion widely in the circumferential direction with respect to its thickness in the radial direction of the rotation shaft can be facilitated, making the deflection arm portion high in rigidity that can sufficiently withstand the frictional resistance of the frictional contact portion. Furthermore, forming a slit in a cylindrical material allows the damping member having at least one frictional contact portion and one deflection arm portion to be easily produced.

When the damping member has the deflection arm portion, it is preferable that the urging means is constituted by a resilient ring member formed in a roughly annular shape to extend around the rotation shaft and the deflection arm portion to urge the frictional contact portion in the radial direction of the rotation shaft.

By the construction previously defined, a simple clamping ring can be used to apply an adequate contact pressure to the frictional contact portion stably in a long term.

In the vibration damping mechanism of the rotation shaft according to the present invention, it is preferable that the resilient ring member be formed in a C-ring shape, and have both circumferential end portions attached by a coupling member engaged with the both circumferential end portions to make the spacing distance between the both circumferential end portions adjustable.

By the construction previously defined, the assembly of the resilient ring member to the damping member can be facilitated as well as making the frictional contact pressure of the frictional contact portion to be adjusted optimally.

In the vibration damping mechanism of the rotation shaft according to the present invention, it is preferable that the frictional contact portion of the damping member be in frictional contact with an outer circumferential surface of the rotation shaft.

By the construction previously defined, the frictional damping mechanism thus structured can be assembled easily to an existing rotation shaft.

In the vibration damping mechanism of the rotation shaft according to the present invention, it is preferable that the rotation shaft has a hollow hole, and the frictional contact portion of the damping member is in frictional contact with an inner circumferential surface of the hollow hole of the rotation shaft.

By the construction previously defined, the friction damping mechanism thus structured can be easily assembled in an existing hollow rotation shaft. In this case, the frictional contact portion of the damping member is urged radially outwardly by the urging means from inside of the hollow hole of the rotating shaft. While the urging means of, for example, a resilient ring member in a C-ring shape, a roughly cylindrical resilient member and the like can be compressed in diameter and inserted inside the frictional contact portion, by constructing the damping member having at least one deflection arm portion so curved that the end portion of the frictional contact portion positioned radially outwardly from the end portion of the fixed portion, the urging means can be integrated with the damping member.

Effect of Invention

According to the present invention, the contact pressure of the frictional contact portion to the rotation shaft is stably given by the urging means, so that the damping property of the frictional contact portion can be maintained in a stable state for a long term with no variability and without being influenced by wear of the frictional contact portion and the dimensional variability of the combination of the rotation shaft and the frictional contact portion, and the vibration damping mechanism can be constructed as not likely to be subject to the limitation in layout as compared with the conventional damper disc type of vibration damping mechanism. As a consequence, the vibration damping mechanism of the rotation shaft can be provided that is not likely to be subject to the limitation in layout and moreover, can maintain the damping property of the frictional contact portion with no variability in a stable state for a long term.

DESCRIPTION OF EMBODIMENTS

The preferred embodiments of the present invention will be explained hereinafter with reference to the drawings.

First Embodiment

FIGS. 1 to 3, FIG. 4A, and FIG. 4B show a vehicular drive shaft equipped with a vibration damping mechanism of a rotation shaft according to a first embodiment of the present invention. The present embodiment is shown to have a one side drive shaft relatively longer in left or right drive shaft of a vehicle to have an intermediate shaft serving as a rotation shaft which is provided with the rotation shaft vibration damping mechanism according to the present invention.

Figure 1:
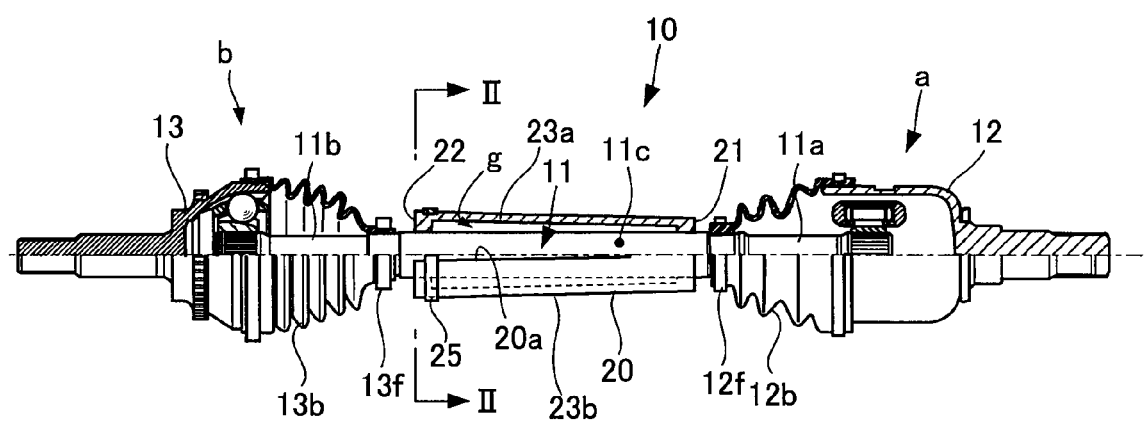
FIG. 1 is a half side cross sectional view of a vehicular drive shaft equipped with a vibration damping mechanism of a rotation shaft according to a first embodiment of the present invention.
Figure 2:
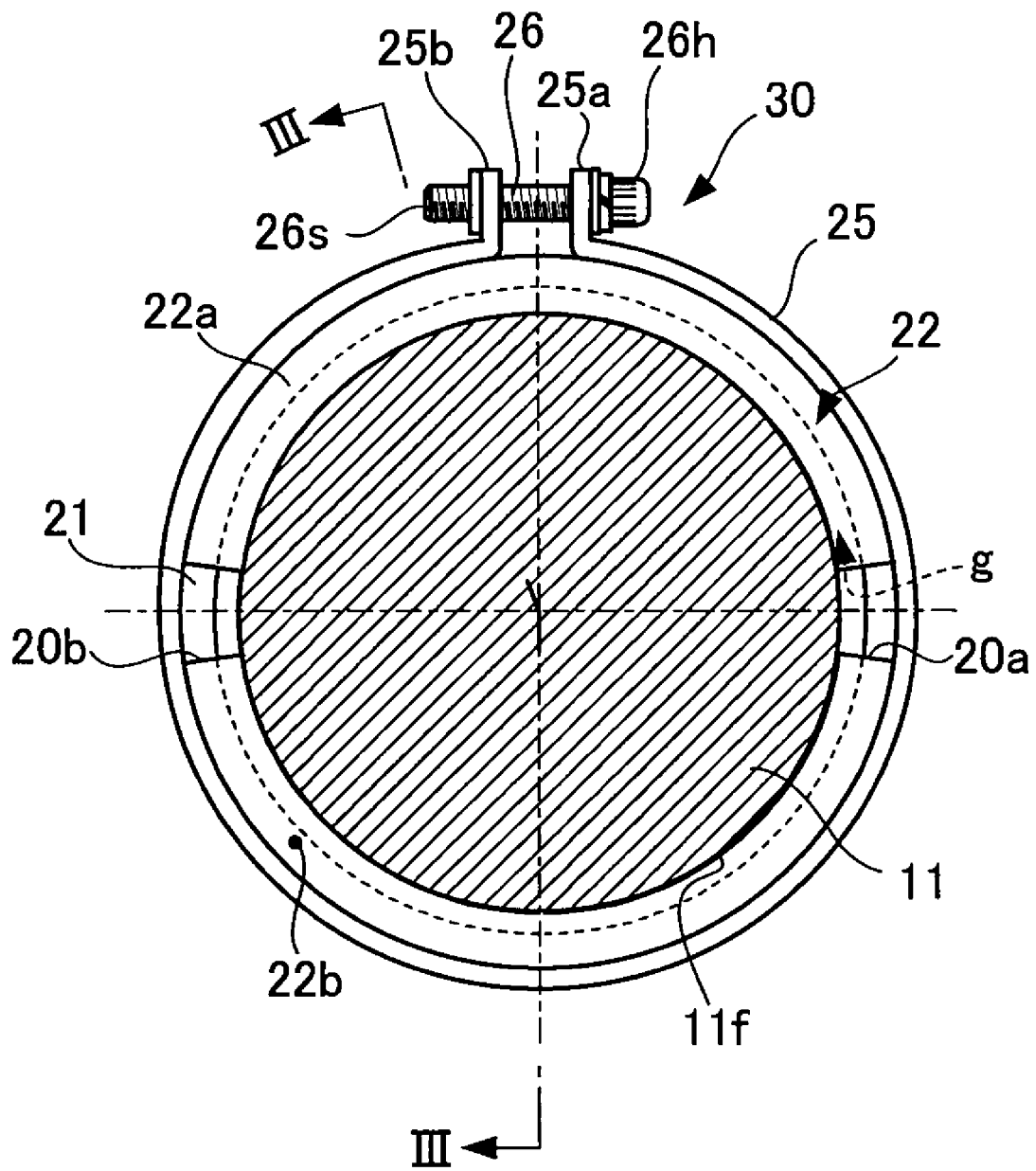
FIG. 2 is a cross sectional view taken along the line II-II of FIG. 1.
Figure 3:
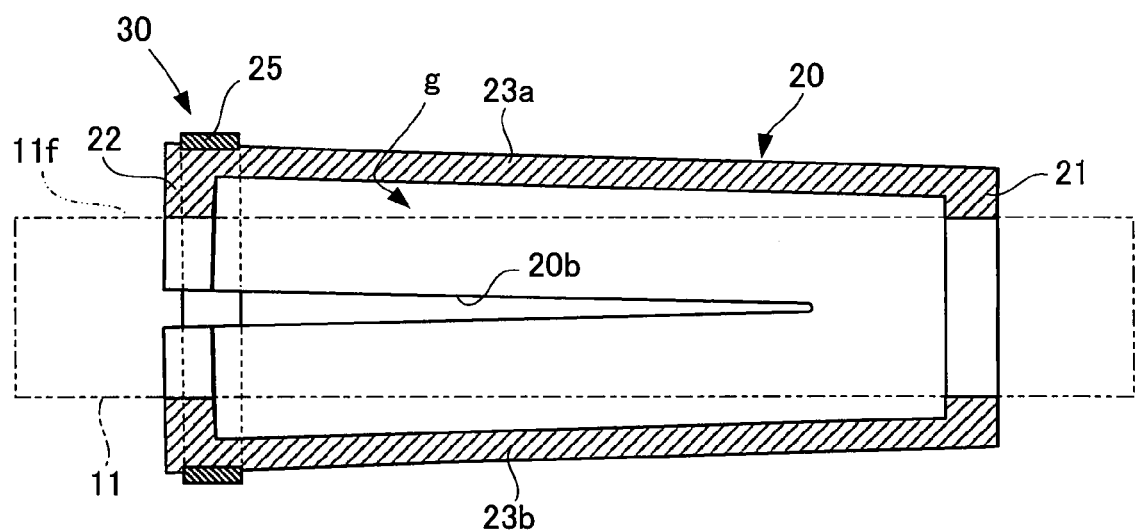
FIG. 3 is a cross sectional view taken along the line III-III of FIG. 2.
Figure 4A:
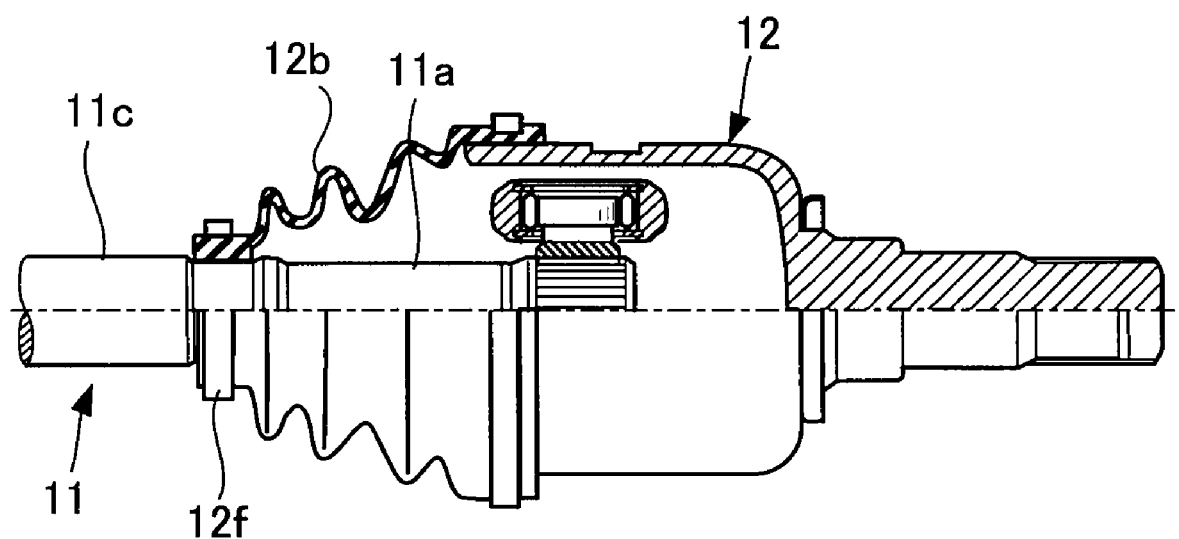
FIG. 4A is a partly enlarged cross sectional view of the drive shaft indicating an "a" portion shown in FIG. 1.
Figure 4B:
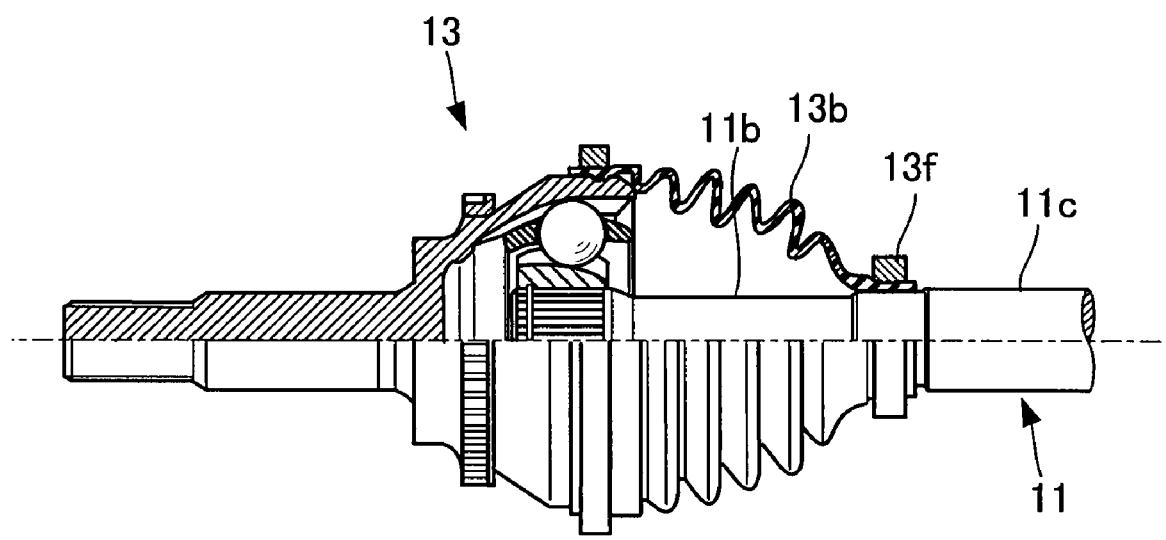
FIG. 4B is a partly enlarged cross sectional view of the drive shaft indicating a "b" portion shown in FIG. 1.

As shown in FIG. 1, a drive shaft 10 comprises a center shaft 11, a tripod type of constant velocity joint 12 provided on one side portion (right side in FIG. 1, see FIG. 4A) of the center shaft 11, and a birfield type of constant velocity joint 13 provided on the other side portion (left side in FIG. 1, see FIG. 4B) of the center shaft 11. The tripod type of constant velocity joint 12 is drivably connected with a differential mechanism (not shown) of a FF transmission that is a rotation shaft on the drive side, while the birfield type of constant velocity joint 13 is drivably connected on a wheel side. This means that the drive shaft 10 is adapted to transmit rotational torque inputted to the center shaft 11 from the differential mechanism through the drive side constant velocity joint 12 to the wheel side through the driven side constant velocity joint 13. The tripod type of constant velocity joint 12 and the birfield type of constant velocity joint 13 are the same in construction as the respective conventional constant velocity joints. Therefore, the detailed explanation about these constructions of the constant velocity joints will be omitted hereinafter.

The center shaft 11 is made of for example, a cylindrical solid steel rod, and serves as a rotation shaft (power transmission shaft, torque transmission shaft) having an input side end portion 11a to which the rotational torque is inputted and an output side end portion 11b from which the rotational torque is outputted. The input side end portion 11a and the output side end portion 11b of the center shaft 11 respectively constitute spline connecting portions on both ends drivably connected with the constant velocity joints 12, 13. The center shaft 11 has an intermediate shaft portion 11c externally exposed having axial end portions around which the end portions of dust boots 12b, 13b forming part of the constant velocity joints 12, 13 are fastened and secured to the center shaft 11 through fastening members 12f, 13f.

The intermediate shaft portion 11c of the center shaft 11 is provided with a damping member 20 made of a material the same as the center shaft 11, for example, steel, formed in a roughly tubular shape or roughly cylindrical shape.

The damping member 20 has a fixed portion 21 fixed to the center shaft 11 at its one end, for example in an interference fit state, and a frictional contact portion 22 held in frictional contact with the center shaft 11 at its other end for example in a transition fit state. The frictional contact portion 22 is in frictional contact with the center shaft 11 at a predetermined contact pressure.

More specifically, the fixed portion 21 is arranged at one end side of the damping member 20, while the frictional contact portion 22 is arranged at the other end side of the damping member 20 in spaced relationship with the fixed portion 21 in an axial direction of the center shaft 11.

The fixed portion 21 of the damping member 20 is formed in an annular shape surrounding the one end portion of the intermediate shaft portion 11c of the center shaft 11. The damping member 20 has at least one slit formed in a cavity shape, for example, a pair of slits 20a, 20b (see FIG. 2) equi-angularly spaced from each other and extending from its other end side towards the fixed portion 21. The frictional contact portion 22 is divided into a plurality of arcuate frictional portions 22a, 22b by the slits 20a, 20b. The fixed portion 21 is arranged closer to the one end side of the damping member 20 from the bottom end portions of the slits 20a, 20b. The slits 20a, 20b are formed to extend in the axial direction of the center shaft 11 by the fixed portion 21 and deflection arm portions 23a, 23b (see FIG. 3).

The damping member 20 has a plurality (at least one) of deflection arm portions 23a, 23b having a cross section nearly the same as that of the arcuate frictional contact portions 22a, 22b between the fixed portion 21 and the arcuate frictional contact portions 22a, 22b. The arcuate frictional contact portions 22a, 22b are integrally connected with the fixed portion 21 through the deflection arm portions 23a, 23b and supported by the fixed portion 21.

Here, each of the deflection arm portions 23a, 23b is thinner in thickness in the radial direction than each of the arcuate frictional contact portions 22a, 22b, and is thinner in the radial direction than the fixed portion 21. The deflection arm portions 23a, 23b are each formed with an outer circumferential surface extending in co-planar relationship with the circumferential surfaces of the fixed portion 21 and each of the arcuate frictional contact portions 22a, 22b forming a space (g) in a roughly cylindrical shape between the deflection arm portions 23a, 23b and the intermediate portion 11c of the center shaft 11.

On the outer circumference of the other end side of the damping member 20 is mounted with a clamping band 25 made of metal having a C-ring shaped cross section to surround the arcuate frictional contact portions 22a, 22b. The clamping band 25 has both circumferential end portions 25a, 25b spaced apart in face-to-face and in parallel with each other. One of the both end portions 25a, 25b rotatably supports a neck portion of an adjustment screw 26 (coupling member) held in engagement with a head portion 26h of the clamping band 25, while the other of the both end portions 25a, 25b is screwed to a threaded portion 26s of the clamping band 25.

The clamping band 25 is formed in a roughly annular shape to extend around the center shaft 11 and the deflection arm portions 23a, 23b. The tightening amount of the adjustment screw 26 can be adjusted to make the spacing distance between the both end portions 25a, 25b adjustable.

The clamping band 25 having the both end portions 25a, 25b urged toward each other constitutes a resilient ring member to urge the arcuate frictional contact portion 22 of the damping member 20 in the radial direction of the center shaft 11. The clamping band 25 and the adjustment screw 26 making the spacing distance between the both end portions 25a, 25b of the clamping band 25 adjustable constitute a pressure mechanism 30 (urging means) for pressuring and urging the arcuate frictional contact portion 22 of the damping member 20 toward the center shaft 11 at a predetermined contact pressure.

The pressure mechanism 30 is capable of applying to the damping member 20 through the clamping band 25 an urging force to urge the frictional contact portion 22 toward the radially center of the center shaft 11 at a position spaced apart from the fixed portion 21 in the axial direction of the center shaft 11.

The arcuate contact portions 22a, 22b of the frictional contact portion 22 receive the urging force from the pressure mechanism 30 to make respective deflections to the deflection arm portions 23a, 23b, so that the arcuate contact portions 22a, 22b of the frictional contact portion 22 can be displaced toward the radial center of the center shaft 11 in response to the deflections of the deflection arm portions 23a, 23b.

The arcuate frictional contact portions 22a, 22b assume their initial forms in which the arcuate frictional contact portions 22a, 22b are held in frictional contact with the outer circumferential surface 11f of the center shaft 11 and have their respective inner circumference radiuses almost the same as or close to the radius of the outer circumferential surface 11f of the center shaft 11. When the arcuate frictional contact portions 22a, 22b are urged by the clamping band 25 of the pressure mechanism 30 under the initial forms of the arcuate frictional contact portions 22a, 22b, the arcuate frictional contact portions 22a, 22b are resiliently deformable with the curvature radius of the inner surface of each of the arcuate frictional contact portions 22a, 22b being varied such that their entire band-like inner surfaces are held in even contact with the outer circumferential surface 11f of the center shaft 11.

Further, in the present embodiment, the frictional contact portion 22 can be released from the tightening by the clamping band 25 of the pressure mechanism 30. At this time, the deflection arm portions 23a, 23b extend in parallel relationship with the outer circumferential surface 11f of the center shaft 11, and the arcuate frictional contact portions 22a, 22b are set to be held in even contact with the outer circumferential surface 11f of the center shaft 11 at their entire band-like inner surfaces at an extremely small contact pressure.

Then, the operation will be explained hereinafter.

In the present embodiment constructed as previously mentioned, the rotational torque is inputted to the center shaft 11 from the differential mechanism of the FF transmission through the drive side constant velocity joint 12. At this time, the rotational torque is transmitted to the wheel through the driven side constant velocity joint 13.

When the engine is accelerated or decelerated under medium and high speed gears, for example, third, fourth or fifth speed stages, there is caused torsional resonance in the drive system, thereby clashing the idling gear pairs in the transmission with each other in a conventional automotive vehicle. This causes a so-called rattling noise (rattling sound). In contrast, in the present embodiment, the contact pressures of the arcuate frictional contact portions 22a, 22b of the frictional contact portion 22 are given to the center shaft 11 in a stable state by the urging force of the pressure mechanism 30 to the frictional contact portion 22, so that the damping property can be maintained in a stable state for a long term without being affected by wear of the frictional contact portion 22 and dimensional variability of the combination of the center shaft 11 and the frictional contact portion 22.

The vibration damping mechanism thus constructed can be satisfactorily reduced in diametrical dimension as compared with a damper disc type of vibration damping mechanism, and does not need any rubber-like resilient members, so that the vibration damping mechanism is not likely to be subject to the limitation in layout and, in addition, can avoid such a problem encountered by the conventional damping mechanism that the rubber-like resilient members are subject to being deteriorated and thus their lowered properties.

The fact that the frictional contact portion 22 of the damping member 20 is arranged in spaced relationship with the fixed portion 21 in the axial direction of the center shaft 11 leads to the fact that not only the contact pressure of the frictional contact portion 22 to the center shaft 11 but also the amount of the relative frictional movement of the frictional contact portion 22 to the center shaft 11 at the time of the torsion vibrations and the bending vibrations of the center shaft 11 can stably be secured, thereby bringing about a stable damping property to the vibration damping mechanism according to the present embodiment.

The amount, herein called, of the relative frictional movement of the frictional contact portion 22 to the center shaft 11 at the time of the vibrations of the center shaft 11 is intended to include at least one of the amount of the frictional movement in the relative torsion direction of the frictional contact portion 22 to the center shaft 11 at the time of the torsion vibrations of the center shaft 11, and the amount of the frictional movement in the relative axial direction of the frictional contact portion 22 to the center shaft 11 at the time of the bending vibrations of the center shaft 11.

In the present embodiment previously mentioned, the pressure mechanism 30 is adapted to urge the frictional contact portion 22 toward the radially center of the center shaft 11 at a position spaced apart from the fixed portion 21 in the axial direction of the center shaft 11, so that the clamping band 25 simple in construction can be used to apply an adequate contact pressure to the frictional contact portion 22.

In particular, the arcuate contact portions 22a, 22b of the frictional contact portion 22 are supported on the fixed portion 21 through the deflection arm portions 23a, 23b to be displaceable in the radial direction of the center shaft 11 in response to the deflections of the deflection arm portions 23a, 23b, so that the vibration damping mechanism according to the present embodiment can use the clamping band 25, or can set an initial deflection amount (resilient deformation amount) to the degree of applying a sufficient contact pressure to the deflection arm portions 23a, 23b, thereby allowing an adequate contact pressure to the frictional contact portion 22 to be maintained in a stable state for a long term.

Further, the slits 20a, 20b are formed in a raw material in a roughly cylindrical shape, thereby making it possible to facilitate widely forming the deflection arm portions 23a, 23b in the circumferential direction with respect to their thicknesses in the radial direction of the center shaft 11. Furthermore, it is possible to make the deflection arm portions 23a, 23b high in rigidity in the torsion directions of the deflection arm portions 23a, 23b in which the deflection arm portions 23a, 23b can sufficiently withstand the frictional resistance of the frictional contact portion 22. As a result, the damping member 20 having the arcuate frictional contact portions 22a, 22b and the deflection arm portions 23a, 23b can be easily produced.

The clamping band 25 of the pressure mechanism 30 is formed in a roughly annular shape to extend around the center shaft 11 and the deflection arm portions 23a, 23b, and the frictional contact portion 22 constitutes a resilient ring member for urging the center shaft 11 in the radial direction of the center shaft 11, so that the clamping band 25 is used to make the adequate contact pressure to be applied to the frictional contact portion 22 in a stable state for a long term.

The both end portions 25a, 25b of the clamping band 25 in a C-ring shape are coupled in spaced apart relationship with each other and the tightening amount of the adjustment screw 26 can be adjusted to make the spacing distance between the both end portions 25a, 25b adjustable, so that the clamping band 25 can be easily assembled to the damping member 20, and the contact pressure of the frictional contact portion 22 can be most adequately adjusted.

Further, the frictional contact portion 22 of the damping member 20 is in frictional contact with the outer circumferential surface 11f of the center shaft 11, thereby making it possible to easily assemble the friction damping mechanism thus constructed to the existing solid center shaft 11.

As is understood from the foregoing description, in the vibration damping mechanism of the rotation shaft according to the present embodiment, the contact pressure of the frictional contact portion 22 to the center shaft 11 is stably applied by the pressure mechanism 30, so that the damping property by the frictional contact portion 22 can be stably maintained in a long term without variation and without being affected by wear of the frictional contact portion 22 and dimensional variability of the combination of the center shaft 11 and the frictional contact portion 22. Moreover, the vibration damping mechanism can be sufficiently small in comparison with the damper disc type of the damping mechanism and not likely to be subject to the limitation in layout. As a consequence, it is understood that the damping mechanism herein described can be not likely to be subject to the limitation in layout and can stably maintain the damping property by the frictional contact portion 22 for a long term without variation.

Second Embodiment

Figure 5A:
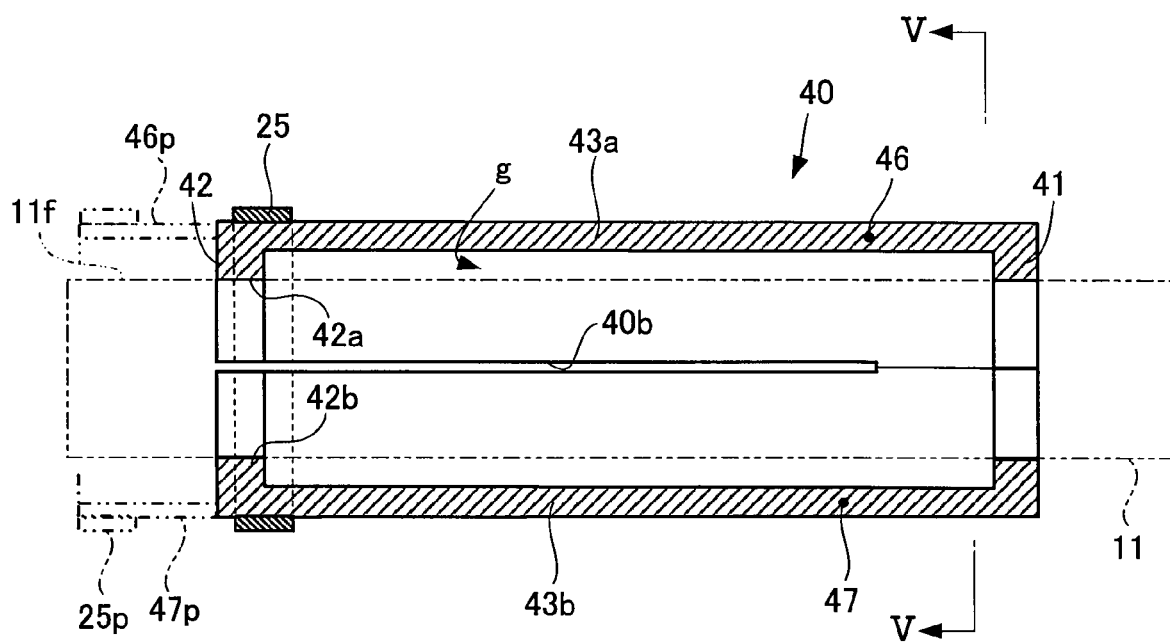
FIG. 5A is a cross sectional view of an essential part of a vibration damping mechanism of a rotation shaft according to a second embodiment of the present invention.
Figure 5B:
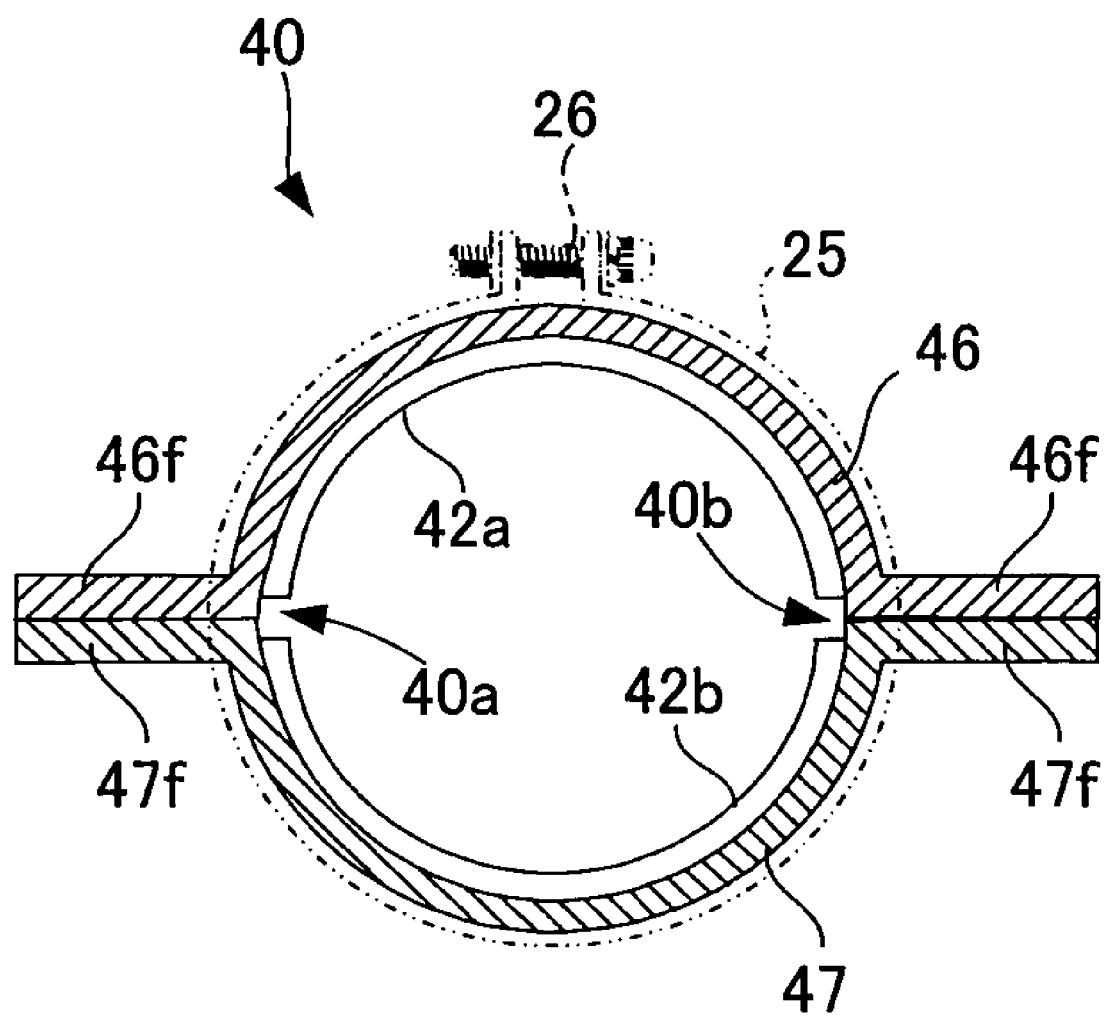
FIG. 5B is a cross sectional view taken along the line V-V of FIG. 5A.

FIGS. 5A and 5B show a vibration damping mechanism of a rotation shaft according to a second embodiment of the present invention. The present embodiment is similar in construction to the first embodiment previously mentioned with the intermediate shaft of the drive shaft serving as a rotation shaft, but different from the first embodiment in term of the damping member constructed to have two dividable bodies in a roughly semi-cylindrical shape. As shown in FIGS. 5A and 5B, in the present embodiment, the intermediate shaft portion 11c of the center shaft 11 has mounted thereon a damping member 40 made of a material similar to that of the center shaft 11, for example, steel in a roughly tubular or cylindrical shape.

The damping member 40 has a fixed portion 41 fixed to the center shaft 11, for example in an interference fit state, and a frictional contact portion 42 in frictional contact with the center shaft 11 for example in a transition fit state. The frictional contact portion 42 is in contact with the center shaft 11 at a contact pressure predetermined.

More specifically, the fixed portion 41 is arranged at one end side of the damping member 40, while the frictional contact portion 42 is arranged at the other end side of the damping member 40 in spaced apart relationship with the fixed portion 41 in the axial direction of the center shaft 11.

As shown in FIG. 5B, the damping member 40 has a pair of a roughly semi-cylindrical bodies 46, 47 welded (or coupled with a bolt) to each other at their projection portions 46f, 47f near the fixed portion 41 to constitute the annular fixed portion 41. A plurality of arcuate frictional contact portions 42a, 42b is supported on the fixed portion 41 through a plurality of deflection arm portions 43a, 43b to form slits 40a, 40b equiangularly spaced apart from each other between the semi-cylindrical portions 46, 47.

Here, each of the deflection arm portions 43a, 43b is thinner in thickness in the radial direction than each of the arcuate frictional contact portions 42a, 42b, and thinner in the radial direction than the fixed portion 41. The deflection arm portions 43a, 43b are each formed with an outer circumferential surface extending in co-planar relationship with the circumferential surfaces of the fixed portion 41 and each of the arcuate frictional contact portions 42a, 42b forming a space (g) in a roughly cylindrical shape between the deflection arm portions 43a, 43b and the intermediate portion 11c of the center shaft 11.

The other construction of the present embodiment is the same as that of the first embodiment.

Also, in the present embodiment, the contact pressure of the frictional contact portion 42 to the center shaft 11 is stably applied by the pressure mechanism 30, so that the damping property by the frictional contact portion 42 can be maintained without variation and without being affected by wear of the frictional contact portion 42 and dimensional variability of the combination of the center shaft 11 and the frictional contact portion 42. As a consequence, it is understood that the damping mechanism herein described can be not likely to be subject to the limitation in layout and can stably maintain the damping property by the frictional contact portion 42 for a long term without variation.

Further, in the present embodiment, the damping member 40 is in the form of block construction, thereby facilitating the assembling the damping member 40 to the center shaft 11.

Third Embodiment

Figure 6A:
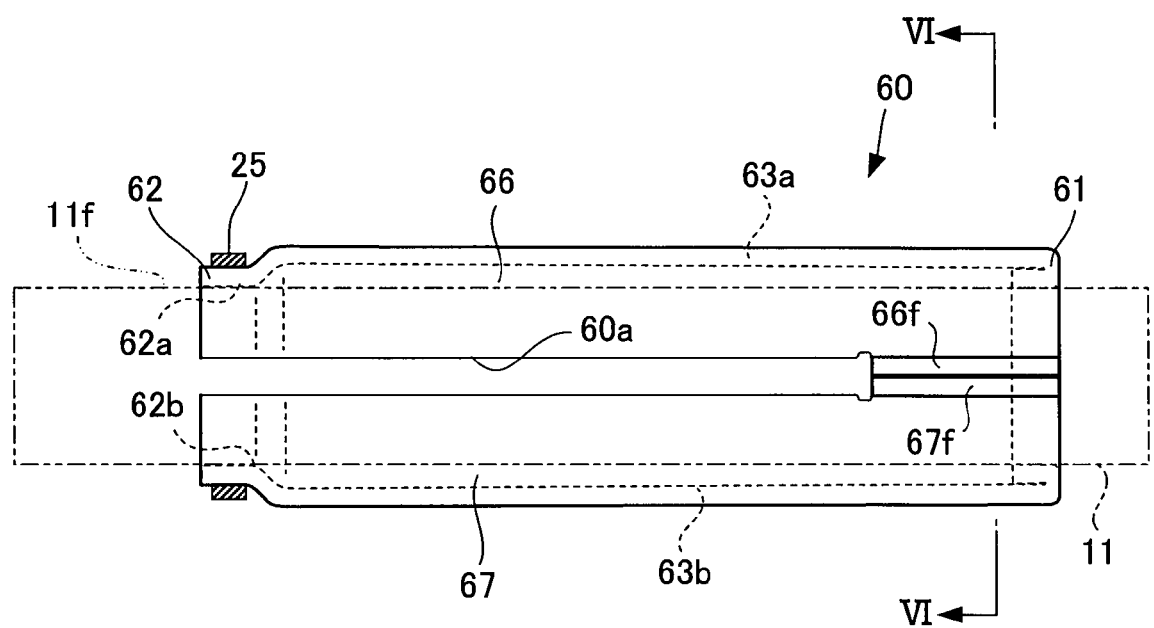
FIG. 6A is a side view of an essential part of a vibration damping mechanism of a rotation shaft according to a third embodiment of the present invention.
Figure 6B:
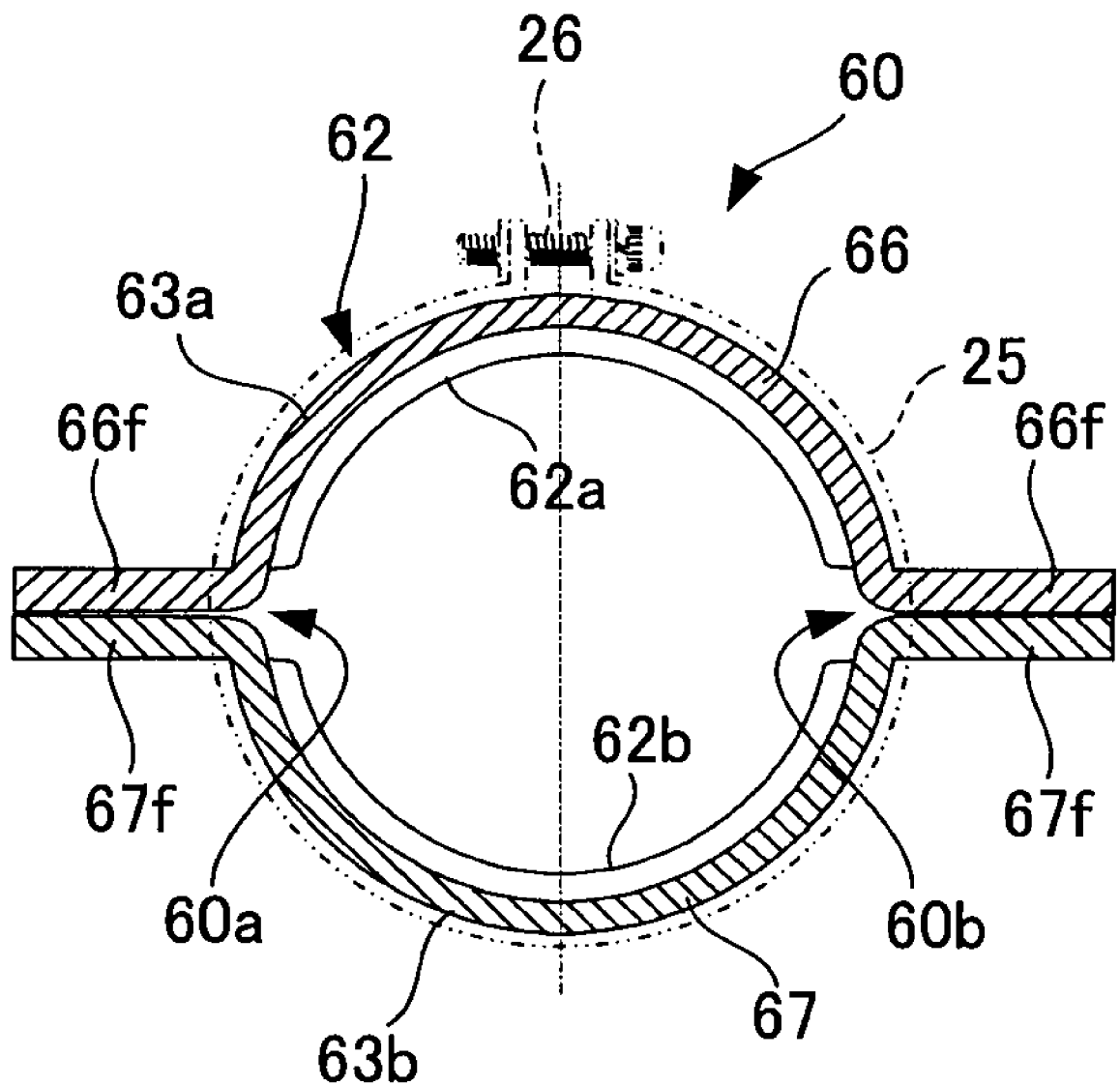
FIG. 6B is a cross sectional view taken along the line VI-VI of FIG. 6A.

FIGS. 6A and 6B show a vibration damping mechanism of a rotation shaft according to a third embodiment of the present invention. The present embodiment is similar in construction to the first embodiment previously mentioned with the intermediate shaft of the drive shaft serving as a rotation shaft and to the second embodiment above with the damping member being in the form of block construction, but is different from the first and the second embodiments in term of the damping member produced in press work.

As shown in FIGS. 6A and 6B, in the present embodiment, the intermediate shaft portion 11c of the center shaft 11 has mounted thereon a damping member 60, for example, made of steel plates processed by press work to be in a roughly tubular or cylindrical shape.

The damping member 60 has a fixed portion 61 fixed to the center shaft 11 at one side, for example in an interference fit state, and the frictional contact portion 62 in frictional contact with the center shaft 11 at the other side, for example in a transition fit state. The frictional contact portion 62 is in contact with the center shaft 11 at a contact pressure predetermined.

More specifically, as shown in FIG. 6B, the damping member 60 is constructed to have an annular fixed portion 61 formed by welding together projecting portions 66f, 67f of a pair of semi-cylindrical bodies 66, 67 made using steel plates, while the damping member 60 is further constructed to have arcuate frictional contact portions 62a, 62b supported on the fixed portion 61 through deflection arm portions 63a, 63b to form slits 60a, 60b equi-angularly spaced apart from each other between the semi-cylindrical bodies 66, 67.

In this case, the deflection arm portions 63a, 63b, the arcuate frictional contact portions 62a, 62b, and the projecting portions 66f, 67f are all the same in thickness, but constructed to have respective inner surfaces each with a radius of curvature required. The radius of the outer surface of each of the deflection arm portions 63a, 63b are different from those of the fixed portion 61 and the arcuate frictional contact portions 62a, 62b.

The other construction of the present embodiment is the same as that of the first embodiment.

Also, the present embodiment can expect an advantageous effect the same as those of the first and the second embodiments. In the present embodiment, the damping member 60 is constructed by a pair of semi-cylindrical bodies 66, 67 made using steel plates, thereby facilitating the assembling the damping member 60 to the center shaft 11 as well as reducing the production cost and saving the weight of the vibration damping mechanism.

Fourth Embodiment

Figure 7:
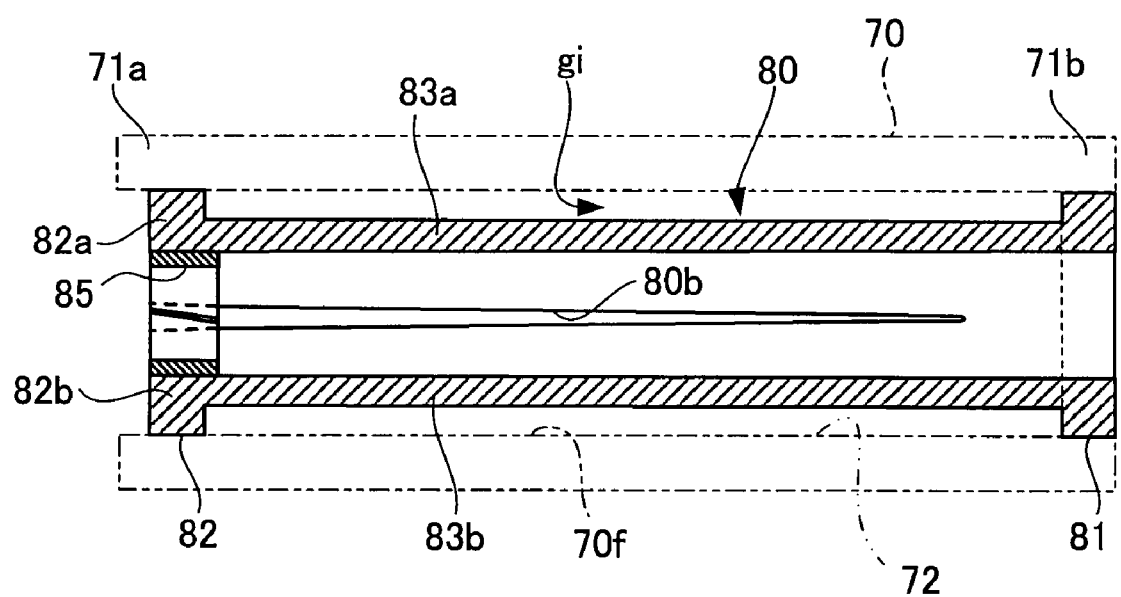
FIG. 7 is a side view of an essential part of a vibration damping mechanism of a rotation shaft according to a fourth embodiment of the present invention.

FIG. 7 shows a vibration damping mechanism of a rotation shaft according to a fourth embodiment of the present invention. The present embodiment has a hollow rotation shaft for transmitting the power, and a damping mechanism provided in the rotation shaft.

In FIG. 7, the rotation shaft 70 is for example constructed by a hollow round rod made of steel, and is designed to output torque inputted to an input side end portion 71a to an output side end portion 71b by gears or spline gears not shown in the drawing. The rotation shaft 70 is formed with a hollow hole 72 in which a damping member 80 made of a material similar to that of the rotation shaft, for example, steel and in a roughly tubular and cylindrical shape is provided.

The damping member 80 has a fixed portion 81 at one end in a flange-like shape and connected to an inner circumferential portion 70f of the rotation shaft 70 for example in an interference fit state, and a frictional contact portion 82 in a flange-like shape at the other end and held in frictional contact with the inner circumferential portion 70f of the rotation shaft 70, for example in a transition fit state. The frictional contact portion 82 is held in frictional contact with the inner circumferential portion 70f of the rotation shaft 70 at a predetermined contact pressure.

More specifically, the fixed portion 81 is arranged at the one end side of the damping member 80, while the frictional contact portion 82 is arranged at the other end side of the damping member 80 in spaced apart relationship with the fixed portion 81 in the axial direction of the rotation shaft 70.

The fixed portion 81 of the damping member 80 is formed in an annular shape along the inner circumference portion 70f of the rotation shaft 70. The damping member 80 is formed with at least one slit in a cavity shape extending from the other end side towards the fixed portion 81, for example, a pair of slits 80b (only one side slit shown in FIG. 7) equi-angularly spaced apart from each other, so that the frictional contact portion 82 is divided into a plurality of arcuate frictional contact portions 82a, 82b by the slits 80b, while the fixed portion 81 is arranged closer to the one end side of the damping member 80 from the bottom portions of the slits 80b.

The damping member 80 has a plurality of deflection arm portions 83a, 83b formed in almost the same arcuate cross section as the arcuate frictional contact portions 82a, 82b between the fixed portion 81 and the arcuate frictional contact portions 82a, 82b. The arcuate frictional contact portions 82a, 82b are integrally connected with the fixed portion 81 through the deflection arm portions 83a, 83b, and supported on the fixed portion 81. The slits 80b of the damping member 80 are formed by the fixed portion 81 and the deflection arm portions 83a, 83b to extend in the axial direction of the rotation shaft 70.

Here, each of the deflection arm portions 83a, 83b is thinner in thickness in the radial direction than each of the arcuate frictional contact portions 82a, 82b, and thinner in the radial direction than the fixed portion 81. The deflection arm portions 83a, 83b are each formed with an inner circumferential surface extending in co-planar relationship with the circumferential surfaces of the fixed portion 81 and each of the arcuate frictional contact portions 82a, 82b to form a space (gi) in a roughly cylindrical shape between the deflection arm portions 83a, 83b and the inner circumferential portion 70f of the rotation shaft 70.

On the other hand, on the inner surface at the other end side of the damping member 80 is provided with an annular pressure spring 85 (urging means) made of metal and formed in a C-ring shape to radially outwardly pressurize and urge the arcuate frictional contact portions 82a, 82b from the inside.

In the present embodiment, the contact pressure of the frictional contact portion 82 to the rotation shaft 70 is stably applied by the annular pressure spring 85, so that the damping property by the frictional contact portion 82 can be maintained without variation and without being affected by wear of the frictional contact portion 82 and dimensional variability of the combination of the rotation shaft 70 and the frictional contact portion 82. Moreover, the damping member 80 being arranged inside the rotation shaft 70 makes it not likely to be subject to the limitation in layout. As a consequence, it is understood that the damping mechanism herein described can be not likely to be subject to the limitation in layout and can be stably maintain the damping property by the frictional contact portion 82 without variation for a long term.

Further, in the above embodiments, the frictional contact portions 22, 42, 62, 82 are respectively positioned at the other end portions of the damping members 20, 40, 60, 80. However, the deflection arm portions may be extended axially outwardly from the frictional contact portion 42 to have extension portions 46p, 47p shown by phantom lines in FIG. 5A, and a clamping band 25p having a smaller tightening force than the clamping band 25 of the pressure mechanism 30 or having a tension spring of a small spring constant in lieu of the adjustment screw 26 may be provided at their ends. The present embodiment thus constructed can also obtain an effective frictional contact pressure on each of the frictional contact portions 22.

The deflection arm portions 23a, 23b (may include other deflection arm portions 43a, 43b, 63a, 63b, 83a, 83b) may be rockably supported at their one end portions on the fixed portion 21.

Although the first to the third embodiments previously mentioned have been explained about the pressure and urging force by the tightening band 25 being adjusted by the adjustment screw 26, the adjustment screw 26 may be replaced by a coupling member such as a tension spring, a plate spring and other springs which can urge the both end portions to get closer to each other.

Alternatively, the initial deflection amount (resilient deformation amount at the time of the assembling of the vibration damping mechanism) of the deflection arm portions 23a, 23b may be set to a larger value to the degree that the frictional contact portion 22 (or the other frictional contact portions 42, 62, 82) can be given a sufficiently large contact pressure to provide a stable and adequate contact pressure on the frictional contact portion 22 for a long term. For example, the frictional contact portion 82 of the damping member 80 is urged radially outwardly from the center of the hollow rotation shaft 70 by the annular pressure spring 85. However, the damping member 80 may be constructed to have the deflection arm portions 83a, 83b curved to have the end portion of the frictional contact portion 82 positioned radially outwardly from the end portion of the fixed end portion 81, thereby imparting a spring function to the deflection arm portions 83a, 83b replacing the annular pressure spring 85.

The at least one slit, for example, the two slits 20a, 20b may be increased in number to no less than three, and also the deflection arm portions 23a, 23b may be increased in number to no less than three.

Further, the embodiments previously mentioned have been explained about the fact that the frictional contact portions 22 of the damping members 20, 40, 60, 80 are provided to project toward the outer peripheral portions 11f of the intermediate shaft portion 11c of the center shaft 11 or the inner peripheral portion 70f of the hollow rotation shaft 70 to directly make the frictional contact. According to the present invention, it may be possible to consider other embodiments one of which partly includes an annular member of an L-shape or T-shape in cross section provided on the outer peripheral surface portion of the rotation shaft to be held in frictional contact with the inner peripheral surface of the frictional contact portion, or the other of which partly includes an annular member of an L-shape or T-shape in cross section provided on the inner peripheral surface portion of the hollow rotation shaft to be held in frictional contact with the outer peripheral surface of the frictional contact portion.

As has been explained above, the vibration damping mechanism of the rotation shaft according to the present invention is constructed to have the contact pressure of the frictional contact portion to the rotation shaft stably applied by the urging means, so that the damping property by the frictional contact portion can be maintained without variation and without being affected by wear of the frictional contact portion and dimensional variability of the combination of the center shaft and the frictional contact portion. Moreover, the damping mechanism described herein is not likely to be subject to the limitation in layout as compared with the damping mechanism of the damper disc type. As a consequence, it is understood that the vibration damping mechanism herein described can be not likely to be subject to the limitation in layout and can stably maintain the damping property by the frictional contact portion without variation for a long term. The vibration damping mechanism according to the present invention is useful for the vibration damping mechanism of the rotation shaft, particularly for the vibration damping mechanism of the rotation shaft in general serving to damp the vibrations by the frictional contact portion.

EXPLANATION OF REFERENCE NUMERALS

10: drive shaft (rotating shaft)
11: center shaft (rotating shaft)
11a; 71a: input side end portion
11b; 71b: output side end portion
11c: intermediate shaft portion
11f: outer circumferential surface
12, 13: constant velocity joint
12b, 13b: dust boot
20; 40; 60; 80: damping member
20a, 20b; 40a, 40b; 60a, 60b; 80b: slit
21; 41; 61; 81: fixed portion
22a, 22b; 42a, 42b; 62a, 62b; 82a, 82b: arcuate frictional portion
22; 42; 62; 82: frictional contact portion
23a, 23b; 43a, 43b; 63a, 63b; 83a, 83b: deflection arm portion (arm portion)
15; 25p: clamping band
25a, 25b: both end portion
26: adjustment screw (coupling member)
26h: head portion
30: pressure mechanism
46, 47; 66, 67: semi-cylindrical body
46f, 47f; 66f, 67f: projection portion
70: hollow rotation shaft (rotation shaft)
70f: inner circumferential surface portion
72: hollow hole

The invention claimed is:

1. A vibration damping mechanism of a rotation shaft, comprising:
a rotation shaft for outputting torque inputted from its input side end portion to its output side end portion, and
a damping member having a fixed portion fixed to the rotation shaft, a frictional contact portion held in frictional contact with the rotation shaft, and at least one deflection arm portion extending in an axial direction of the rotation shaft between the frictional contact portion and the fixed portion,
the frictional contact portion being provided with an urging means for urging the frictional contact portion toward the rotation shaft to be held in frictional contact with the rotation shaft at a predetermined contact pressure, and being supported on the fixed portion through the deflection arm portion to be deformable in the radial direction of the rotation shaft in response to deflection of the deflection arm portion.

2. The vibration damping mechanism of the rotation shaft as set forth in claim 1, wherein the frictional contact portion of the damping member is arranged in spaced relationship with the fixed portion in the axial direction of the rotation shaft.

3. The vibration damping mechanism of the rotation shaft as set forth in claim 1, wherein the urging means is constructed to apply to the damping member an urging force to urge the frictional contact portion in the radial direction of the rotation shaft at a position spaced apart from the fixed portion in the axial direction of the rotation shaft.

4. The vibration damping mechanism of the rotation shaft as set forth in claim 3, wherein the frictional contact portion of the damping member is arranged in spaced relationship with the fixed portion in the axial direction of the rotation shaft.

5. The vibration damping mechanism of the rotation shaft as set forth in claim 4, wherein the fixed portion of the damping member is formed in an annular shape to surround the rotation shaft, and the damping member has at least one slit formed to extend in the axial direction of the rotation shaft by the fixed portion and the deflection arm portion.

6. The vibration damping mechanism of the rotation shaft as set forth in claim 4, wherein the urging means is constituted by a resilient ring member formed in a roughly annular shape to extend around the rotation shaft and the deflection arm portion to urge the frictional contact portion in the radial direction of the rotation shaft.

7. The vibration damping mechanism of the rotation shaft as set forth in claim 6, wherein the resilient ring member is formed in a C-ring shape, and has both circumferential end portions attached by a coupling member engaged with the both circumferential end portions to make a spacing distance between the both circumferential end portions adjustable.

8. The vibration damping mechanism of the rotation shaft as set forth in claim 1, wherein the fixed portion of the damping member is formed in an annular shape to surround the rotation shaft, and the damping member has at least one slit formed to extend in the axial direction of the rotation shaft by the fixed portion and the deflection arm portion.

9. The vibration damping mechanism of the rotation shaft as set forth in claim 1, wherein the urging means is constituted by a resilient ring member formed in a roughly annular shape to extend around the rotation shaft and the deflection arm portion to urge the frictional contact portion in the radial direction of the rotation shaft.

10. The vibration damping mechanism of the rotation shaft as set forth in claim 9, wherein the resilient ring member is formed in a C-ring shape, and has both circumferential end portions attached by a coupling member engaged with the both circumferential end portions to make a spacing distance between the both circumferential end portions adjustable.

11. The vibration damping mechanism of the rotation shaft as set forth in claim 1, wherein the frictional contact portion of the damping member is in frictional contact with an outer circumferential surface of the rotation shaft.

12. The vibration damping mechanism of the rotation shaft as set forth in claim 1, wherein the rotation shaft has a hollow hole, and the frictional contact portion of the damping member is in frictional contact with an inner circumferential surface of the hollow hole of the rotation shaft.

* * * * *